UNITED STATES PATENT OFFICE.

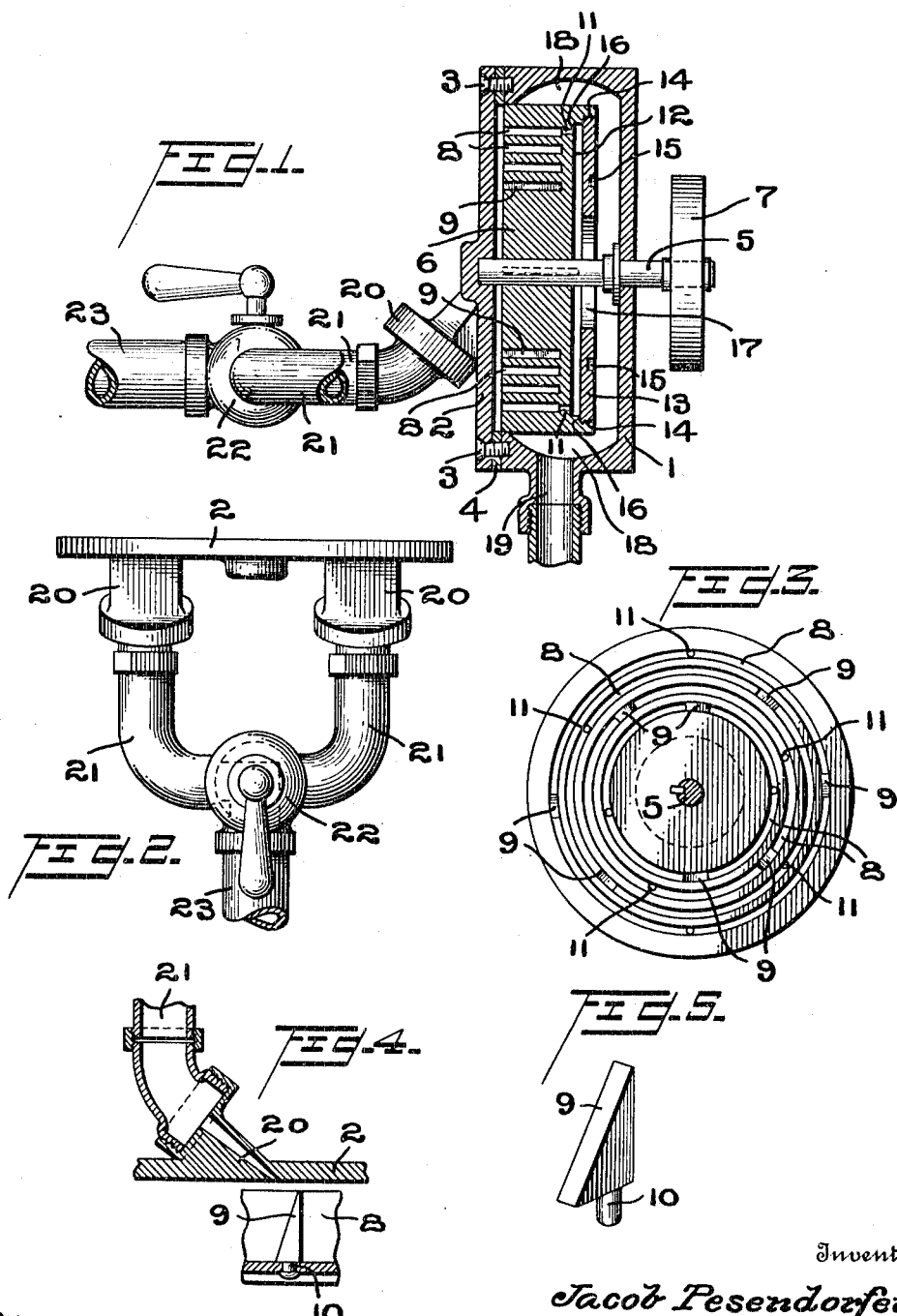

JACOB PESENDORFER, OF PHILADELPHIA, PENNSYLVANIA.

TURBINE.

1,120,237.   Specification of Letters Patent.   Patented Dec. 8, 1914.

Application filed March 13, 1914. Serial No. 824,363.

*To all whom it may concern:*

Be it known that I, JACOB PESENDORFER, a citizen of the United States, residing at Philadelphia, in the county of Philadelphia and State of Pennsylvania, have invented certain new and useful Improvements in Turbines, of which the following is a specification.

My invention relates to improvements in turbines, the object of the invention being to provide an improved construction of rotary element adapted to be driven by steam, water, or any fluid, and which will utilize both the impact or kinetic energy, and the pressure of the fluid.

A further object is to provide a turbine in which the rotary element turns with a minimum of frictional contact and in which the frictional engagement of the fluid with the walls of the casing is reduced to a minimum.

A further object is to provide in the face of a rotary element a series of concentric grooves providing in each groove a plurality of pins or abutments with openings through the rotary element at the base of the grooves, said openings permitting the fluid to pass through the rotary element in a chamber formed in the other face of the rotary element, and kept from direct contact with the casing except through an opening at the center of the rotary element where the frictional resistance of the fluid to the rotation of the element is reduced to a minimum.

A further object is to provide a turbine of the character stated which may be readily driven in either direction, and which may be made of any size to suit conditions at a relatively small cost, so that the turbine may be furnished to the trade at a relatively low price, and will occupy but very small space in use.

With these and other objects in view, the invention consists in certain novel features of construction and combinations and arrangements of parts as will be more fully hereinafter described and pointed out in the claims.

In the accompanying drawings: Figure 1 is a view in longitudinal section showing a portion of one of the supply pipes broken away. Fig. 2 is an edge view of the covering plate showing the arrangement of nozzles and supply pipes. Fig. 3 is a face view of the rotary element. Fig. 4 is a fragmentary view in section illustrating one of the nozzles and its relation to the rotary element, and Fig. 5 is an enlarged perspective view of one of the pins or abutments.

1 represents the casing of my improved turbine which is of general cylindrical form and is closed by a removable plate 2 secured by screws 3 with a packing ring or gasket 4 preferably interposed between the plate and the casing to insure a tight juncture.

In the plate 2 and end wall of casing 1, a shaft 5 is mounted and has keyed thereto in the casing, my improved rotary element 6, while on the outer end of the casing I have illustrated a pulley 7 from which power may be taken off in any desired manner.

The invention is, of course, not limited to any particular use of the turbine, and other power transmitting means may be employed as desired.

The rotary element 6 comprises a cylindrical block having in one face a series of concentric grooves 8. These grooves are of a width and depth in accordance with the fluid power used. In other words, when water is the motive force, I will use larger grooves than with steam, and hence the invention is not limited to the size or number of these grooves.

Each groove is provided with a plurality of abutments 9 which are preferably blocks of general triangular shape having studs 10 thereon projected through openings in the rotary element at the base of the groove and riveted as shown clearly in Fig. 4.

In the base of each groove, and preferably midway between the abutments 9, openings 11 are provided through which the fluid passes into a chamber 12 formed in the rear face of the rotary element. This chamber 12 is preferably formed by recessing the rear face of the rotary element and covering said recessed portion by a removable ring 13 which is screw-threaded and engages internal threads 14 in the rotary element.

The ring 13 is provided with recesses 15 for the reception of a spanner to turn the same, and the chamber 12 has an annular shoulder 16 which limits the inward movement of the ring, so that a space or chamber is provided into which all of the openings 11 direct the fluid.

The ring 12 has a central opening 17 around the shaft 5, so that the fluid may freely escape into the casing, and it will be noted particularly by reference to Fig. 1, that the cylindrical wall of the casing 1 has an internal annular recess 18 so that the rotary element at its periphery contacts with but a relatively small portion of the casing.

19 represents an outlet communicating with the recessed portion 18, so that the fluid may freely escape around the outside of the rotary element through this outlet. The cover 2 is provided at opposite sides with integral nozzles 20, one of which is shown in section in Fig. 4. These nozzles direct a relatively wide thin stream of fluid into the grooves 8, and they are of a width so as to discharge into all of the grooves and against the abutments 9 as clearly shown.

By providing the two nozzles, the direction of the turbine can be readily reversed, and to facilitate this reversal, I connect the nozzles 20 by branch pipes 21 with a three-way valve 22 which has a supply pipe 23 connected with any suitable reservoir or source of motive fluid.

It will be noted, particularly by reference to Fig. 4, that the block 9 which constitutes the abutment, has a sharp end so that it offers little resistance to the fluid as it passes from the nozzle and quickly presents an abutment or surface against which the fluid impacts. The inclined wall of the block is in the direction to receive the normal impact, and the straight wall receives the impact when the turbine is reversed.

While I have illustrated what I believe to be a preferred arrangement of parts, I would have it understood that my invention is not limited to the precise details set forth, and various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a turbine, the combination with a casing, of a rotary element in the casing having in one face a series of concentric grooves, blocks secured in the grooves having inclined faces, said rotary element having openings therethrough in the base of its grooves, and a nozzle directing fluid against the blocks in the grooves, substantially as described.

2. In a turbine, the combination with a casing, of a rotary element in the casing, said rotary element having in its face a circular groove with an abutment in the groove and an opening in the base of the groove, and means for directing fluid into the groove, said rotary element having a chamber formed in its inner face into which the fluid from the grooves is directed, substantially as described.

3. In a turbine, the combination with a casing, of a rotary element in the casing having a series of concentric grooves in the face thereof, with abutments in the grooves and openings through the rotary element in the base of each groove, and means for directing motive fluid into the grooves, said rotary element having a chamber formed in its inner face into which the fluid from the grooves is directed, substantially as described.

4. In a turbine, the combination with a casing, of a rotary element in the casing having in one face a series of concentric grooves, blocks secured in the grooves having inclined faces, said rotary element having openings therethrough in the base of its grooves, a nozzle directing fluid against the blocks in the grooves, said rotary element having a chamber formed in its inner face into which the fluid from the grooves is directed, substantially as described.

5. In a turbine, the combination with a casing, of a rotary element in the casing, said rotary element having in its face a circular groove with an abutment in the groove and an opening in the base of the groove, means for directing fluid into the groove, said rotary element having a chamber formed in its inner face into which the fluid from the grooves is directed, a ring screwed into the recessed and threaded inner face of the rotary element and constituting a wall of said chamber, and said ring having a central opening through which the fluid escapes into the casing, substantially as described.

6. In a turbine, the combination with a casing, of a rotary element in the casing having a series of concentric grooves in the face thereof, with abutments in the grooves and openings through the rotary element in the base of each groove, means for directing motive fluid into the grooves, said rotary element having a chamber formed in its inner face into which the fluid from the grooves is directed, a ring screwed into the recessed and threaded inner face of the rotary element and constituting a wall of said chamber, and said ring having a central opening through which the fluid escapes into the casing, substantially as described.

7. In a turbine, the combination with a casing, of a rotary element in the casing having in one face a series of concentric grooves, blocks secured in the grooves having inclined faces, said rotary element having openings therethrough in the base of its grooves, a nozzle directing fluid against the blocks in the grooves, said rotarty element having a chamber formed in its inner face into which the fluid from the grooves is directed, a ring screwed into the recessed and threaded inner face of the rotary element and constituting a wall of said chamber, and said ring having a central opening through which the fluid escapes into the casing, substantially as described.

8. In a turbine, the combination with a casing, of a rotary element in the casing, said rotary element having in its face a circular groove with an abutment in the groove and an opening in the base of the groove, means for directing fluid into the groove, said rotary element having a chamber formed in its inner face into which the fluid from the grooves is directed, said casing having an internal annular recess in its wall around the turbine, and an outlet communicating with said recessed portion, substantially as described.

9. In a turbine, the combination with a casing, of a rotary element in the casing having a series of concentric grooves in the face thereof, with abutments in the grooves and openings through the rotary element in the base of each groove, and means for directing motive fluid into the grooves, said rotary element having a chamber formed in its inner face into which the fluid from the grooves is directed, said casing having an internal annular recess in its wall around the turbine, and an outlet communicating with said recessed portion, substantially as described.

10. In a turbine, the combination with a casing, of a rotary element in the casing having in one face a series of concentric grooves, blocks secured in the grooves having inclined faces, said rotary element having openings therethrough in the base of its grooves, a nozzle directing fluid against the blocks in the grooves, said rotary element having a chamber formed in its inner face into which the fluid from the grooves is directed, said casing having an internal annular recess in its wall around the turbine, and an outlet communicating with said recessed portion, substantially as described.

11. In a turbine, the combination with a casing, of a rotary element in the casing, said rotary element having in its face a circular groove with an abutment in the groove and an opening in the base of the groove, means for directing fluid into the groove, said rotary element having a chamber formed in its inner face into which the fluid from the grooves is directed, a ring screwed into the recessed and threaded inner face of the rotary element and constituting a wall of said chamber, said ring having a central opening through which the fluid escapes into the casing, said casing having an internal annular recess in its wall around the turbine, and an outlet communicating with said recessed portion, substantially as described.

12. In a turbine, the combination with a casing, of a rotary element in the casing having a series of concentric grooves in the face thereof, with abutments in the grooves and openings through the rotary element in the base of each groove, means for directing motive fluid into the grooves, said rotary element having a chamber formed in its inner face into which the fluid from the grooves is directed, a ring screwed into the recessed and threaded inner face of the rotary element and constituting a wall of said chamber, said ring having a central opening through which the fluid escapes into the casing, said casing having an internal annular recess in its wall around the turbine, and an outlet communicating with said recessed portion, substantially as described.

13. In a turbine, the combination with a casing, of a rotary element in the casing having in one face a series of concentric grooves, blocks secured in the grooves having inclined faces, said rotary element having openings therethrough in the base of its grooves, a nozzle directing fluid against the blocks in the grooves, said rotary element having a chamber formed in its inner face into which the fluid from the grooves is directed, a ring screwed into the recessed and threaded inner face of the rotary element and constituting a wall of said chamber, said ring having a central opening through which the fluid escapes into the casing, said casing having an internal annular recess in its wall around the turbine, and an outlet communicating with said recessed portion, substantially as described.

14. In a turbine, the combination with a casing, a removable plate secured to one end of the casing, a shaft mounted to turn in said plate and projecting through the casing, a rotary element secured to the shaft and having in its face adjacent the plate a series of concentric grooves with abutments in the grooves and openings through the rotary element in the base of each groove, inclined nozzles formed in the plate at opposite sides thereof adapted to direct motive fluid into the grooves, and means connected to the nozzles for directing motive fluid to either of the nozzles, whereby the direction of rotation of the rotary element may be reversed, substantially as described.

In testimony whereof I have signed my name to this specification in the presence of two subscribing witnesses.

JACOB PESENDORFER.

Witnesses:
JOHN H. FLOHR,
JAMES K. JOHNSON.